United States Patent
Sudhakar et al.

(10) Patent No.: US 8,458,477 B2
(45) Date of Patent: Jun. 4, 2013

(54) COMMUNICATION WITH NON-REPUDIATION

(75) Inventors: Gosukonda Naga Venkata Satya Sudhakar, Bangalore (IN); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 604 days.

(21) Appl. No.: 12/325,425

(22) Filed: Dec. 1, 2008

(65) Prior Publication Data
US 2010/0135497 A1 Jun. 3, 2010

(51) Int. Cl.
*H04L 9/32* (2006.01)
*H04L 9/00* (2006.01)
*G06F 15/16* (2006.01)
*A63F 13/00* (2006.01)

(52) U.S. Cl.
USPC ........... 713/176; 713/170; 713/171; 713/180; 726/5; 380/277; 463/29

(58) Field of Classification Search
USPC .......... 173/155–159, 170–176; 713/170–176, 713/155–159; 709/229; 380/28–30, 255–283
See application file for complete search history.

(56) References Cited

U.S. PATENT DOCUMENTS

| | | | |
|---|---|---|---|
| 5,226,079 A | 7/1993 | Holloway | |
| 5,710,816 A | 1/1998 | Stork et al. | |
| 5,790,669 A | 8/1998 | Miller et al. | |
| 5,892,900 A | 4/1999 | Ginter et al. | |
| 6,044,463 A | 3/2000 | Kanda et al. | |
| 6,119,179 A | 9/2000 | Whitridge et al. | |
| 6,134,329 A | 10/2000 | Gao et al. | |
| 6,158,003 A | 12/2000 | Kara | |
| 6,336,105 B1 | 1/2002 | Conklin et al. | |
| 6,470,448 B1 | 10/2002 | Kuroda et al. | |
| 6,510,513 B1 | 1/2003 | Danieli | |
| 6,532,543 B1 | 3/2003 | Smith et al. | |
| 6,859,795 B1 | 2/2005 | Zolotorev et al. | |
| 6,904,521 B1 | 6/2005 | Jivsov | |
| 6,963,974 B1 | 11/2005 | Skinner et al. | |
| 6,973,545 B2 | 12/2005 | Cypher | |

(Continued)

FOREIGN PATENT DOCUMENTS

WO WO-2001025883 4/2001

OTHER PUBLICATIONS

Boudaoud, K., et al., "NRPP : A new solution to prove the receipt of an electronic document", *10th HP Openview University Association Plenary Workshop (HPOVUA)*, Geneva, Switzerland, http://www.hpovua.org/PUBLICATIONS/PROCEEDINGS/10_HPOVUAWS/papers/pdf/HPOVUA03-B8.pdf, (Jul. 2003), 1-3.

Tak, S., et al., "A Software Framework for Non-repudiation Service in Electronic Commerce based on the Internet", *Eleventh International Conference on Computer Communications and Networks*, 2002. Proceedings., http://www.sice.umkc.edu/~leeyu/Publications/cpaper9.pdf, (2002), 182-189.

(Continued)

*Primary Examiner* — Evans Desrosiers
(74) *Attorney, Agent, or Firm* — Schwegman, Lundberg & Woessner, P.A.

(57) ABSTRACT

Apparatus, systems, and methods may operate to compare a first hashed value of at least a first decryption key, the first decryption key received from a sender, to a second hashed value of at least a second decryption key that has been received as a signed value from a receiver. Further operations may include sending the first decryption key to the receiver and sending the signed value to the sender upon determining that the first hashed value matches the second hashed value. Additional apparatus, systems, and methods are disclosed.

25 Claims, 5 Drawing Sheets

U.S. PATENT DOCUMENTS

| | | | |
|---|---|---|---|
| 7,016,089 | B2 | 3/2006 | Yoneda et al. |
| 7,142,676 | B1 | 11/2006 | Hillier |
| 7,185,047 | B1 | 2/2007 | Bate et al. |
| 7,203,709 | B2 | 4/2007 | Long et al. |
| 7,298,851 | B1 | 11/2007 | Hendricks et al. |
| 7,353,204 | B2 | 4/2008 | Liu et al. |
| 7,434,048 | B1 | 10/2008 | Shapiro et al. |
| 7,840,813 | B2 | 11/2010 | Canard et al. |
| 7,890,757 | B2 | 2/2011 | Sudhakar |
| 8,171,293 | B2 | 5/2012 | Sudhakar |
| 2001/0025311 | A1 | 9/2001 | Arai et al. |
| 2001/0037453 | A1 | 11/2001 | Mitty et al. |
| 2002/0004902 | A1 | 1/2002 | Toh et al. |
| 2002/0143710 | A1 | 10/2002 | Liu |
| 2002/0194470 | A1 | 12/2002 | Grupe |
| 2003/0046533 | A1 | 3/2003 | Olkin et al. |
| 2003/0084003 | A1 | 5/2003 | Pinkas et al. |
| 2003/0126464 | A1 | 7/2003 | McDaniel et al. |
| 2004/0078567 | A1 | 4/2004 | Newbould |
| 2004/0215964 | A1 | 10/2004 | Barlow et al. |
| 2005/0021973 | A1* | 1/2005 | Chen et al. ............ 713/176 |
| 2005/0039031 | A1 | 2/2005 | Mont et al. |
| 2005/0076210 | A1 | 4/2005 | Thomas et al. |
| 2005/0169479 | A1* | 8/2005 | Ekstrom ............ 380/277 |
| 2005/0251691 | A1 | 11/2005 | Haufe |
| 2006/0085359 | A1 | 4/2006 | Kim |
| 2006/0242068 | A1 | 10/2006 | Jogand-Coulomb et al. |
| 2007/0157031 | A1 | 7/2007 | Sudhakar |
| 2007/0160203 | A1 | 7/2007 | Sudhakar |
| 2008/0214300 | A1* | 9/2008 | Williams et al. ............ 463/29 |
| 2009/0030838 | A1 | 1/2009 | Jacob et al. |
| 2009/0083372 | A1 | 3/2009 | Teppler |
| 2009/0319797 | A1* | 12/2009 | Tornqvist ............ 713/176 |
| 2010/0125893 | A1 | 5/2010 | Kumar et al. |
| 2011/0185170 | A1 | 7/2011 | Sudhakar |

OTHER PUBLICATIONS

Tak, Sung Woo, et al., "A Software Framework for Non-repudiation Service in Electronic Commerce based on the Internet", *Information Systems Frontiers*, 6(1), (2004), 47-66.

Bo, M, et al., "A fair non-repudiation protocol", *Computer Supported Cooperative Work in Design*, The 7th International Conference on, (2002), 68-73.

"U.S. Appl. No. 11/430,454, Final Office Action mailed Jul. 18, 2011", 18 pgs.

"U.S. Appl. No. 11/430,454, Final Office Action mailed Dec. 21, 2010", 17 pgs.

"U.S. Appl. No. 11/430,454, Response filed May 23, 2011 to Final Office Action mailed Dec. 21, 2010", 9 pgs.

"U.S. Appl. No. 11/430,539, Notice of Allowance mailed Nov. 15, 2010", 8 pgs.

"IBM Tivoli Directory Server tuning", http://publib.boulder.ibm.com/infocenter/tivihelp/v2r1/index.jsp?topic=/com.ibm.IBMDS.doc/tuning05.htm, Directory Server, Version 6.1, (Downloaded Sep. 15, 2008).

"U.S. Appl. No. 11/430,454, Response filed Oct. 18, 2011 to Final Office Action mailed Jul. 18, 2011", 10 pgs.

"U.S. Appl. No. 13/082,092, Non Final Office Action mailed Nov. 4, 2011", 13 pgs.

Bahreman, Alireza, et al., "Certified Electronic Mail", Prec. Symposium on Network and Distrbuted Systems Security Internet Society, (Feb. 1994), 17 pgs.

Chaum, David, "Blind Signatures for Untraceable Payments", Department of Computer Science, (1998), 6 pgs.

\* cited by examiner

COMMUNICATION WITH NON-REPUDIATION

RELATED APPLICATIONS

This Application is related to U.S. patent application Ser. No. 11/430,539, titled RECEIVER NON-REPUDIATION, and filed on May 9, 2006. This Application is also related to U.S. patent application Ser. No. 11/430,454, titled RECEIVER NON-REPUDIATION VIA A SECURE DEVICE, and filed on May 9, 2006. Both of these applications are assigned to the assignee of the instant application, Novell, Inc.

BACKGROUND

The goal of various non-repudiation schemes is essentially to provide proof that a message has been sent and received. In many cases, a third party (e.g., a central authority or arbitrator) is used to verify time stamps and digital signatures that serve to document the interaction between a message sender and a message receiver.

While several mechanisms to support non-repudiation have been developed, most of them burden the network with duplicative data transmission, and/or rely on extensive participation by the third party to the transaction. In addition, the third party may operate to store and maintain transaction records that will support verification efforts in the future, perhaps to resolve potential disputes.

SUMMARY

In various embodiments, apparatus, systems, and methods that support non-repudiation are provided. For example, in some embodiments, communication with non-repudiation is provided by comparing a first hashed value of at least a first decryption key, the first decryption key received from a sender, to a second hashed value of at least a second decryption key that has been received as a signed value from a receiver. Further activities include sending the first decryption key to the receiver and sending the signed value to the sender upon determining that the first hashed value matches the second hashed value. Thus, the match is used to verify that the first decryption key is the same as the second decryption key. Additional embodiments are described, and along with the foregoing example, will be set forth in detail below.

DETAILED DESCRIPTION

The inventors have discovered a mechanism to discourage repudiation that does not involve communication with a trusted third party (TTP) until near the end of the transaction. In most embodiments, the TTP does not receive or transmit the message to be communicated. Further, there is no need to maintain transaction records by the TTP after the end of the integral communication transaction—proof of the activity that occurred is provided in other ways.

As used herein, an "integral communication transaction" is a sequence of communications between a sender of a message and a receiver of the message that satisfies the following three conditions: (1) the sender transmits the message (or some form of the message, such as an encrypted version of the message) to the receiver, either directly, or via a TTP; (2) the message and whatever information is needed for decoding the message (e.g., a key) into its original form is received by the receiver; and (3) proof of the transmission and the reception are generated.

A "receiver" is a party to an integral communication transaction that operates to receive a message, perhaps encrypted, from a sender.

A "sender" is a party to an integral communication transaction that operates to send a message to the receiver. The message sent may be encrypted.

A "trusted third party" or TTP is an entity that facilitates interactions between two parties (e.g., a sender and a receiver) who both trust the third party. The parties that trust the TTP use this trust to secure their own interactions.

Embodiments of the invention can be implemented in a variety of architectural platforms, operating and server systems, devices, systems, and applications. Any particular architectural layout or implementation presented herein is thus provided for purposes of illustration and comprehension only, and is not intended to limit the various embodiments.

Figure 1:
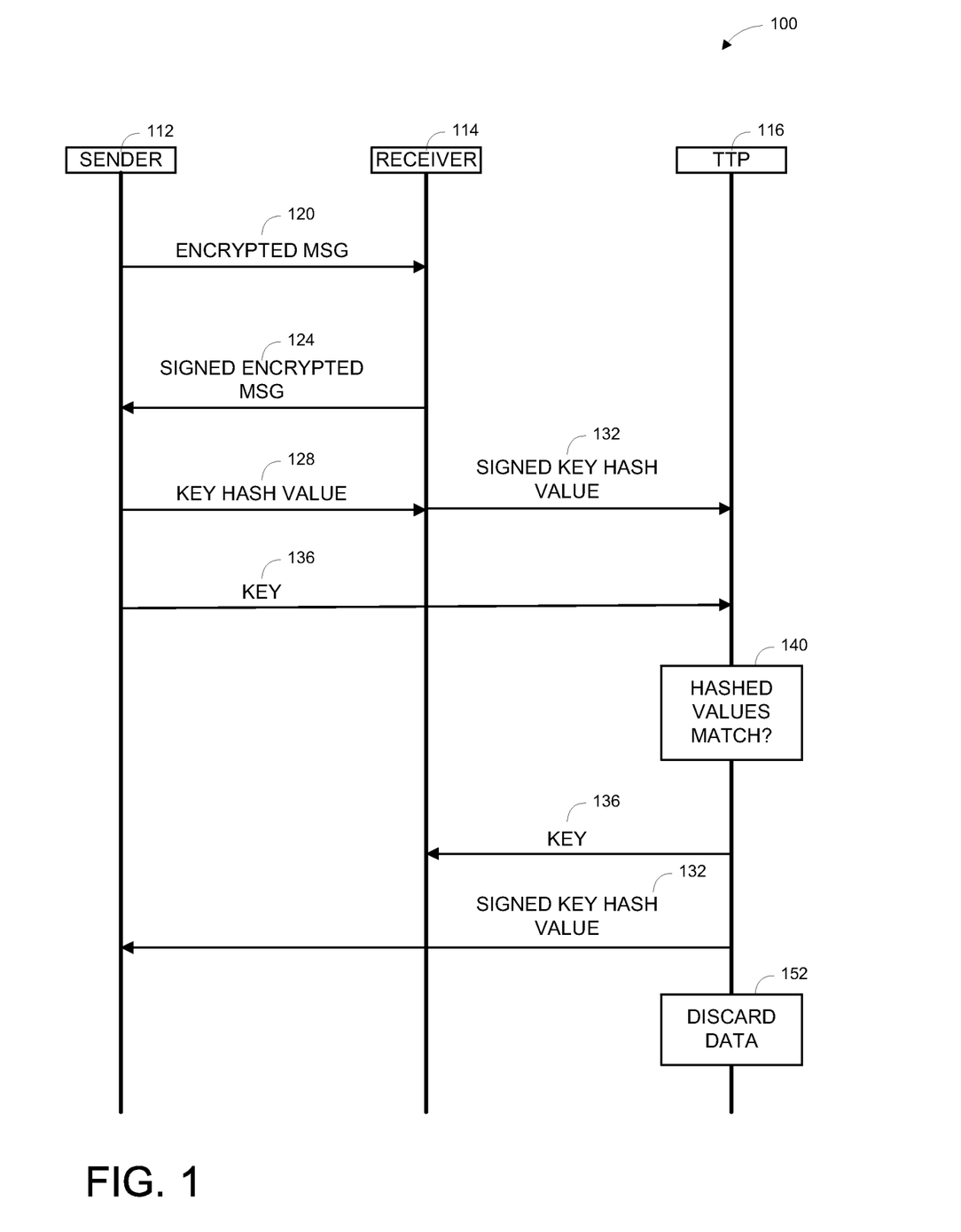
FIG. 1 is a communication flow diagram of an integral communication transaction according to various embodiments of the invention.

FIG. 1 is a communication flow diagram of an integral communication transaction 100 according to various embodiments of the invention. The diagram illustrates the presence of a sender 112, a receiver 114, and a TTP 116 engaged in a communication transaction 100.

To begin the transaction 100, the sender 112 operates to send an encrypted message 120 to the receiver 114. This message 120 may be sent in the form of multiple packets. The receiver 114, in turn, signs the encrypted message to provide a signed version of the encrypted message 124, which is sent to the sender 112. Various parameters, such as the encryption algorithm and TTP that will be used, may be negotiated as part of the protocol between the sender 112 and the receiver 114, perhaps as information included with the messages 120, 124.

In conventional systems, a problem now arises with respect to sending the decryption key to the receiver. That is, the receiver may simply take the decryption key, but not sign the key for return to the sender as proof of key receipt. This is because, with receipt of the encrypted message and the decryption key, nothing more is needed by the receiver to decrypt the message. Thus, repudiation by the receiver is possible. Therefore, in most embodiments, upon receipt of the signed version of the encrypted message 124, the sender 112 responds by sending a hashed value of the decryption key 128 to the receiver 114, instead of the decryption key itself.

At this point the receiver 114 operates to sign the hashed value of the decryption key 128, and sends the signed hashed value of the key (as a signed value 132) to the TTP 116. At about the same time, the sender 112 can send the decryption key 136 to the TTP 116.

Now the TTP 116 can compare the signed key hash value 132 provided by the receiver 114 with a hashed value of the encryption key 136 provided by the sender 112. If the values match, as determined at block 140, then the decryption key 136 received from the sender 112 is sent as a decryption key from the TTP 116 to the receiver 114, and the signed value 132 received from the receiver is sent as a signed value 148 from the TTP to the sender. No record needs to be maintained by the TTP, since the sender 112 has proof that the receiver 114 has received the encrypted message 120, because the sender has received the signed encrypted message 124 from the receiver. The sender 114 also has proof that the receiver 114 has received the decryption key 136, because the TTP 116 has returned the signed value 132 to the sender 114. Thus, after the signed value 132 is successfully sent to the sender 112, the TTP 116 can discard all data 152 with respect to the communication transaction 100.

Any or all of the communications between the entities involved (e.g., the sender 112, the receiver 114, and the TTP 116) can make use of a secure channel, including a secure sockets layer (SSL). It should be noted that the decryption key 136 referenced herein is different from the key used as part of a SSL. Thus, many embodiments may be realized.

Figure 2:
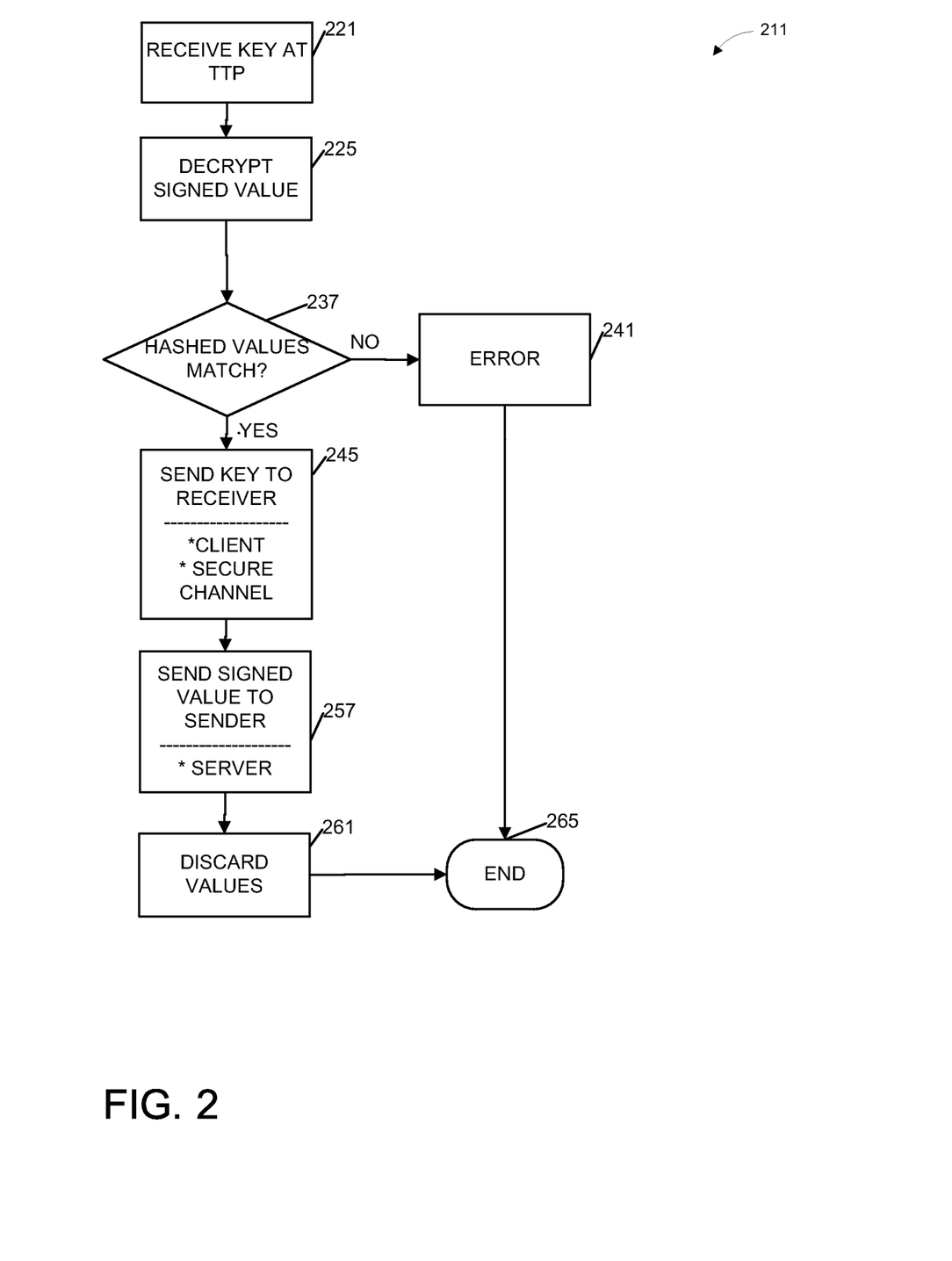
FIG. 2 is an activity flow diagram illustrating a variety of methods according to various embodiments of the invention.

For example, FIG. 2 is a flow diagram illustrating a variety of methods 211 according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a machine, cause the machine to perform the processing depicted and described with respect to FIG. 1.

Thus, in some embodiments, a computer-implemented method 211 of communicating messages may begin at block 221 with receiving a (first) decryption key from the sender at a TTP, perhaps via a secure channel, such as an SSL. The TTP may process the (first) decryption key to provide a (first) hashed value of the (first) decryption key.

The method 211 may continue on to block 225 with decrypting a signed value of a hashed value of a (second) decryption key that has been provided by the receiver. This hashed value, which results from decryption at block 225, is called the "second" hashed value of the "second" decryption key, since at this point, it is unknown whether the decryption key associated with the sender (the first decryption key) is the same as the decryption key associated with the receiver (the second decryption key).

It should be noted that when the TTP decrypts the signed hashed value of the (second) decryption key, there may also be a unique identifier included in the hashed value. Thus, decryption at this point may provide a hashed value of more than just the (second) decryption key. For example, some combination of a decryption key and a unique identifier, such as a global unique identifier (GUID), may be included in the hashed value. Such an identifier can be used to definitively associate the hashed value signed by the receiver, for example, with a particular sending entity.

Thus, in some embodiments, the second hashed value including at least a decryption key comprises a hashed value of a decryption key and an identifier. The identifier may comprise any number of possible values, including one or more of a sender-provided identifier, a receiver-provided identifier, or a combination of the sender-provided identifier and the receiver-provided identifier. The sender-provided identifier and the receiver-provided identifier may each comprise a GUID, for example.

The method 211 may continue on to block 237, to include comparing the first hashed value of at least the first decryption key (e.g., the first hashed value may include more than a decryption key received from the sender; perhaps some combination of the decryption key and a GUID associated with the sender and/or receiver) to a second hashed value of at least a second decryption key that has been received as a signed value from a receiver (e.g., the second hashed value may also include more than a decryption key, as described previously).

If the first hashed value does not match the second hashed value as a result of the comparing, as determined at block 237, the method 211 may continue on to block 241 with sending an error message to the sender, the receiver, or both, since this result may indicate a fraudulent attempt to communicate. The method 211 may end at this point, at block 265.

If the hashed values match, as determined at block 237, the method 211 may include going on to block 245 with sending, by the TTP, the (first) decryption key to the receiver. In some cases, a server and a client may operate as the sender and receiver, respectively. Thus, the activity at block 245 may include sending the (first) decryption key to a client device as the receiver, by a server operating as the sender. In some cases, a server and a client may also operate as the receiver and the sender, respectively.

The method 211 may go on to block 257 to include sending the signed value to the sender upon determining that the first hashed value matches the second hashed value, which serves to verify that the first decryption key is the same as the second decryption key. In some cases, a server and a client may operate as the sender and receiver, respectively. Thus, the activity at block 257 may include sending the signed value from the receiver (perhaps operating as a client) to a server (operating as the sender).

Either of the sending activities in block 245 and 257 may comprise the use of a secure channel. Thus, sending the (first) decryption key to the receiver may comprises sending the decryption key to the receiver via a secure channel, perhaps via an SSL. Similarly, sending the signed value to the sender may also comprise the use of a secure channel, such as an SSL.

The method 211 may continue on to block 261 with discarding, by the TTP, the first hashed value, the second hashed value, the signed value, and the decryption key as part of an integral communication transaction that includes the comparing and the sending activities at blocks 237, 245, and 257. Still further embodiments may be realized.

Figure 3:
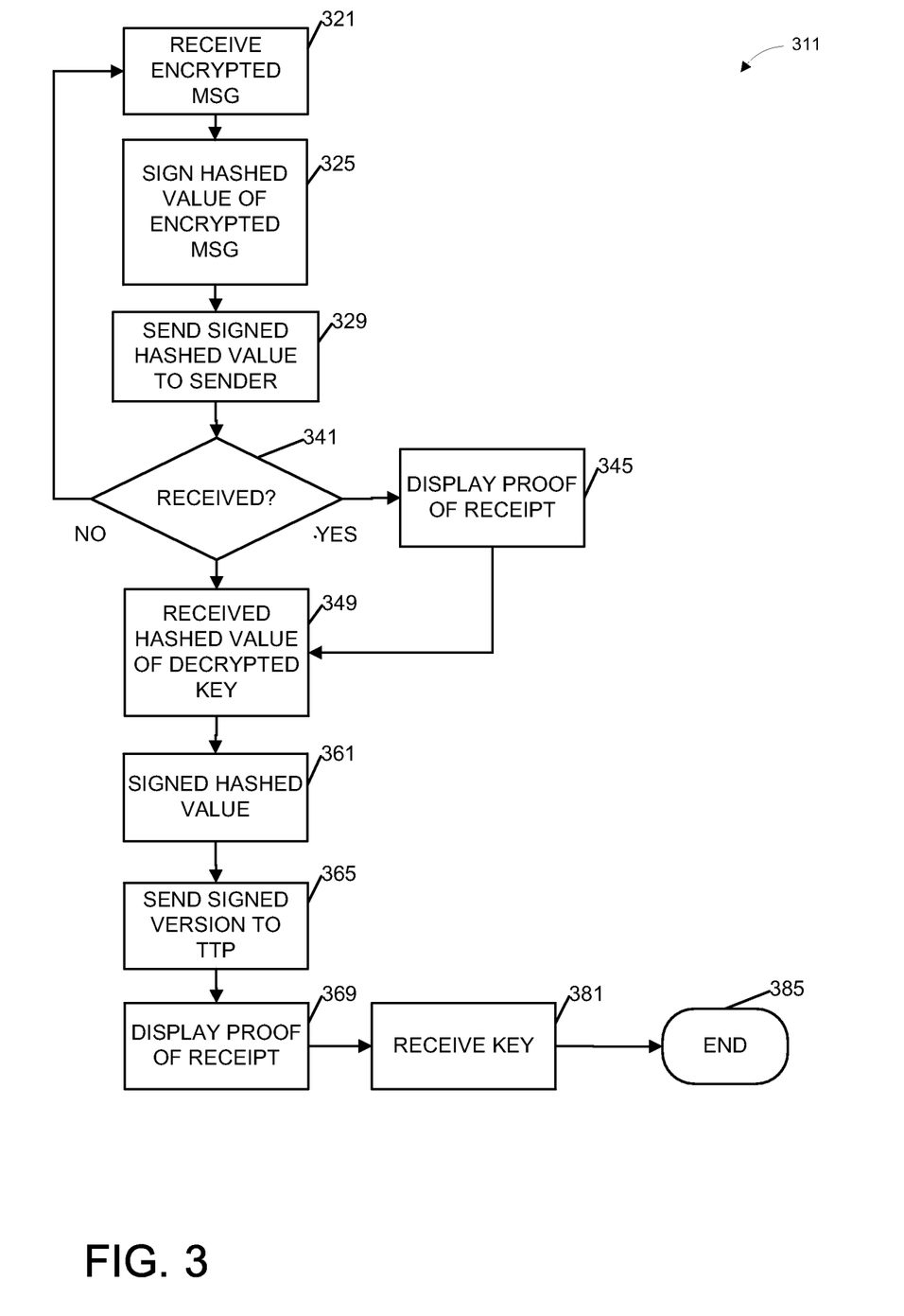
FIG. 3 is an activity flow diagram illustrating additional methods according to various embodiments of the invention.

For example, FIG. 3 is a flow diagram illustrating additional methods 311 according to various embodiments of the invention. The methods 311 are implemented in a machine-accessible and readable medium, and are operational over processes within and among networks. The networks may be wired, wireless, or a combination of wired and wireless. The methods 311 may be implemented as instructions, which when accessed by a machine, cause the machine to perform the processing depicted and described with respect to FIG. 1.

In some embodiments, a computer-implemented method 311 of communicating messages begins at block 321 with receiving, at a receiver, the encrypted message from the sender. Thus, from the receiver's perspective, an integral communication transmission begins with receiving the encrypted message.

The encrypted message may comprise any type of information. Thus the encrypted message may comprise any one or more of an email message, a funds transfer request, an indication of funds received, an indication of funds transmitted (such as when currency is transmitted or received, a charge is made against a credit card, or as part of the transfer requests that occur in conjunction with banking and other business transactions that may be subject to repudiation).

The encrypted message may also comprise software program instructions, such as when software programs are downloaded by an end user, a retailer, or a distributor. The encrypted message may also comprise professional advice, such as financial, legal, or medical advice.

The method 311 may go on to include, at block 325, signing a hashed value of the encrypted message to provide the signed hashed value of the encrypted message, to serve as an indication that the encrypted message has been received by the receiver. The method 311 may further include sending the signed hashed value of the encrypted message from the receiver to the sender at block 329. Once the sender receives this indication, comprising a signed hashed value of the encrypted message, the sender has proof that the encrypted message itself has been received by the receiver.

If it is determined that the signed hashed value of the encrypted message has been received by the sender, at block 341, then the method 311 may go on to block 345 with displaying proof of receiving the encrypted message by displaying information confirming receipt of the signed hashed value of the encrypted message. If it can't be determined that the sender has received the signed hashed value of the encrypted message at block 341, the method 311 may return to block 321, with the sender operating to re-send the encrypted message.

The method 311 may continue on to include, at block 349, receiving, at the receiver, a hashed value of a decryption key. The method 311 may then include signing the hashed value of the decryption key to provide a signed version of the hashed value of the decryption key at block 361, and then sending the signed version to a TTP at block 365.

The method 311 may then go on to include, at block 369, displaying proof of decryption key receipt by displaying information confirming receipt of the signed version. This is because receipt of the signed version of the hashed value of the decryption key proves receipt of the hashed value of the decryption key itself.

The method 311 may go on to block 381 with receiving the decryption key from the TTP at the receiver (after sending the signed version of the hashed value of the decryption key to the TTP occurs at block 365). The decryption key will be sent to the receiver by the TTP if there is a match of the hashed values at the TTP, as described previously. The method 311 may then end at block 385.

In any of the cases where a decryption key is mentioned herein, it should be noted that the decryption key may form one part of an encryption key—decryption key asymmetric pair. In some embodiments, however, the decryption key comprises a symmetric key. Thus, the encryption/decryption process can be symmetric or asymmetric, as desired.

The methods described herein do not have to be executed in the order described, or in any particular order, unless so specified. Moreover, various activities described with respect to the methods identified herein can be executed in repetitive, looped, serial, or parallel fashion. The individual activities of the methods shown in FIGS. 2 and 3 can also be combined with each other and/or substituted, one for another, in various ways. Information, including parameters, commands, operands, and other data, can be sent and received in the form of one or more carrier waves.

Figure 4:
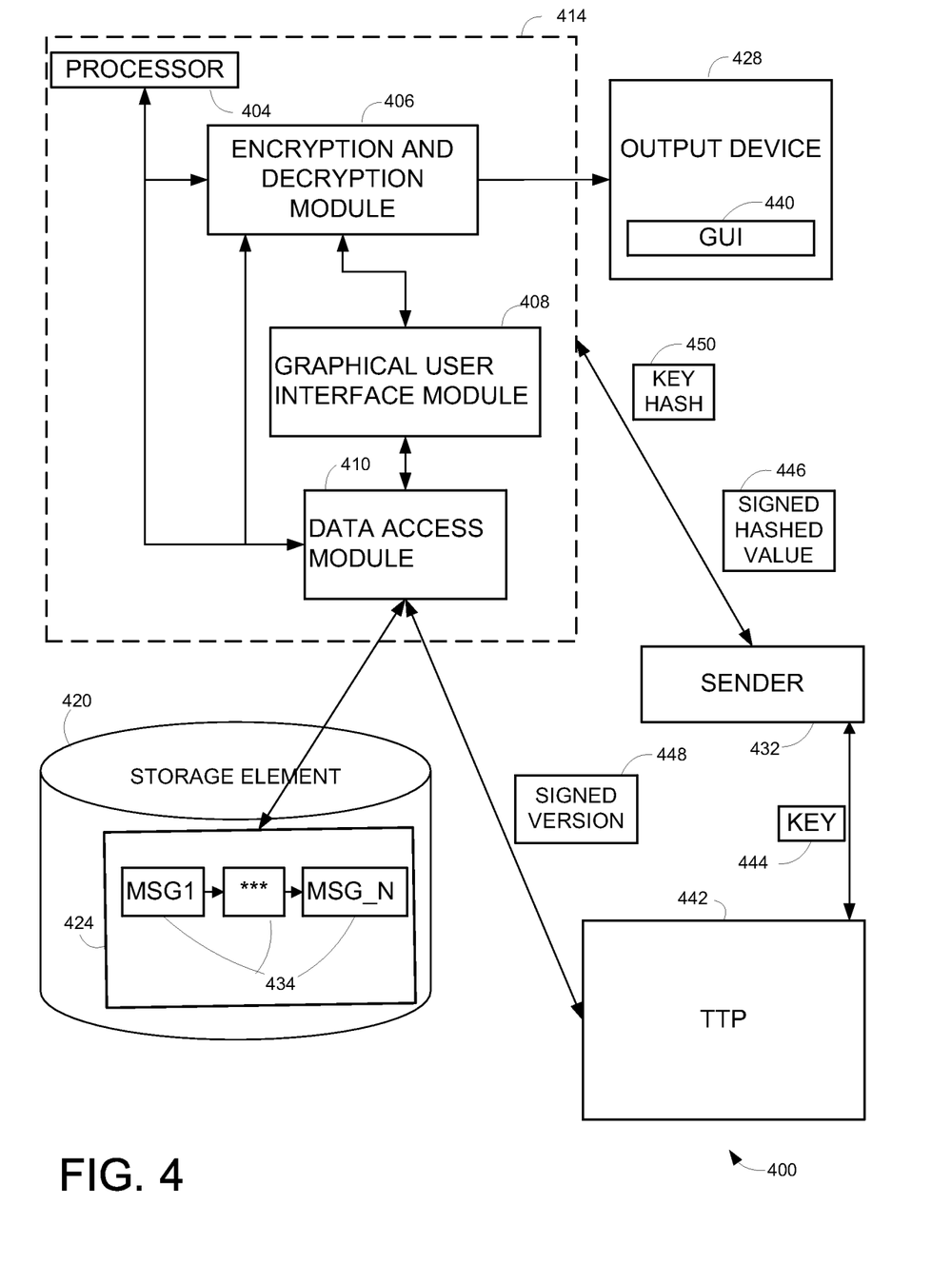
FIG. 4 is a block diagram of an apparatus and system that can operate to communicate messages according to various embodiments of the invention.

FIG. 4 is a block diagram of an apparatus 414 and system 400 that can operate to communicate messages according to various embodiments of the invention. The apparatus 414 and system 400 may be implemented in a machine-accessible and readable medium and is operational over one or more networks. The networks may be wired, wireless, or a combination of wired and wireless. The apparatus 414 and system 400 implement, among other things, the processing associated with the communication activity of FIG. 1, and the methods 211 and 311 of FIGS. 2 and 3, respectively.

The system 400 may include a number of modules such as one or more processors 404, an encryption/decryption module 406, a GUI module 408 and a data access module 410. The encryption/decryption module 406 and the GUI module 408 may take the form of an integral module, or exist as separate modules, as shown. The encryption/decryption module 406 may be integrated, as shown, or divided into separate encryption and decryption modules.

These modules may be associated within an apparatus 414, such as a personal digital assistant (PDA), laptop computer, personal computer, workstation, client, server, or any other machine, as indicated by their containment within the dashed box. The apparatus 414 may operate as a receiver or sender in some embodiments.

In order to avoid obscuring the components of FIG. 4, connecting lines between each of the elements within the apparatus 414 have not been shown. However, those of ordinary skill in the art will understand that any of the individual elements shown to be located within the confines of the apparatus 414 may be operably coupled to any other element within the apparatus 414. Similarly, those of ordinary skill in the art will understand that any of the components shown to be located within the confines of the apparatus 414 may also be located outside the apparatus 414, and appropriately coupled to the apparatus 414 via wired or wireless networks or other interface mechanisms.

The data access module 410 may be used by the encryption/decryption module 406 to access a storage element 420, such as a database, a memory, a disk, or other storage device. The storage element 420 may serve to contain one or more items having electronic content 424, such as messages (or encrypted messages) and other information 434, including encryption and decryption keys, used to decode encrypted messages back into their original form. The data access module 410 may operate to read from and/or write to the electronic content 424 and may provide reading and writing services for the benefit of other system modules, including the GUI module 408, the encryption/decryption module 406, and the processor 404.

The messages and other information 434 may be transferred to other devices, such as a sender 432 and a TTP 442. The sender 432, the TTP 442, or both, may comprise clients and/or servers.

The data access module 410 may be present in some embodiments, and absent in others. When present, the data access module 410 may operate as a mediator between the various components of the system 400 and the electronic content 424. For example, the storage element 420 may be included in a remote server.

The encryption/decryption module 406 may be operably coupled to an output device 428, such as a server, client device, display device (e.g., monitor, projector, video card, etc.), printer, or loudspeaker, among others. The output device 428 may be used for presenting renderings of the output generated by or derived from the messages and other information 434. Rendering may take the form of displaying screen images. The GUI module 408 may be operably connected to the encryption/decryption module 406 and the data access module 410. Thus, many embodiments may be realized.

For example, an apparatus 414 operating as a receiver and implementing the various methods described may comprise one or more processors 404, and a memory, such as the storage element 420, to store an encrypted message MSG1 and instructions (in the form of messages and other information 434) which, when executed by the one or more processors 404, results in the one or more processors 404 operating to: send a signed hashed value 446 of an encrypted message MSG1 to a sender 432, to receive a hashed value of a decryption key 450, to sign the hashed value of the decryption key 450 to provide a signed version 448 of the hashed value of the decryption key, and to send the signed version 448 to a TTP 442. The apparatus 414 may also include an output device 428, such as a display device to display a decrypted form of the encrypted message in human-perceptible format, perhaps as part of a GUI 440.

The apparatus 414 may further comprise a decryption module as part of an encryption/decryption module 406, or as a separate module, to use a decryption key 444 received from a TTP 442 to decrypt the encrypted message MSG1, providing the decrypted form of the encrypted message MSG1. The apparatus 414 may also include an encryption module as part of an encryption/decryption module 406, or as a separate module, to provide the signed hashed value 446 of the encrypted message MSG1. Still further embodiments may be realized.

Figure 5:
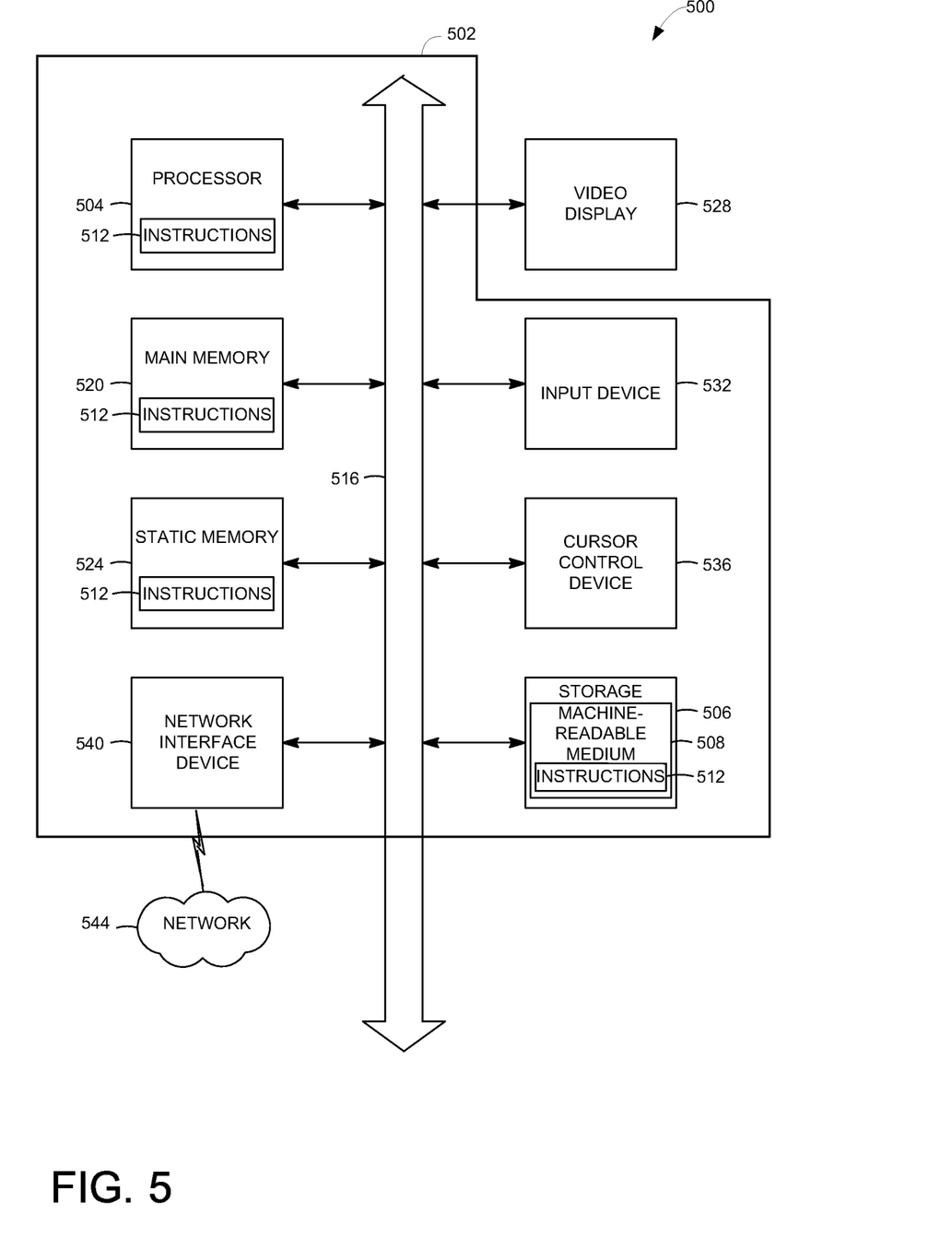
FIG. 5 is a block diagram of an article of manufacture, including a machine, according to various embodiments of the invention.

For example, FIG. 5 is a block diagram of an article 500 of manufacture, including a machine 502, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 500 of manufacture, such as a computer, a memory system, a magnetic or optical disk, some other storage device, and/or any type of electronic device or system may include one or more processors 504 coupled to a machine-readable medium 508 such as a memory (e.g., removable storage media, as well as any memory including an electrical, optical, or electromagnetic conductor) having instructions 512 stored thereon (e.g., computer program instructions), which when executed by the one or more processors 504 result in the machine 502 performing any of the actions described with respect to the methods above.

The machine 502 may take the form of a computer system having a processor 504 coupled to a number of components directly, and/or using a bus 516. Thus, the machine 502 may be similar to or identical to the apparatus 414 or system 400 shown in FIG. 4.

Turning now to FIG. 5, it can be seen that the components of the machine 502 may include main memory 520, static or non-volatile memory 524, and mass storage 506. Other components coupled to the processor 504 may include an input device 532, such as a keyboard, a cursor control device 536, such as a mouse. An output device 528, such as a video display, may be located apart from the machine 502 (as shown), or made as an integral part of the machine 502.

A network interface device 540 to couple the processor 504 and other components to a network 544 may also be coupled to the bus 516. The instructions 512 may be transmitted or received over the network 544 via the network interface device 540 utilizing any one of a number of well-known transfer protocols (e.g., HyperText Transfer Protocol). Any of these elements coupled to the bus 516 may be absent, present singly, or present in plural numbers, depending on the specific embodiment to be realized.

The processor 504, the memories 520, 524, and the storage device 506 may each include instructions 512 which, when executed, cause the machine 502 to perform any one or more of the methods described herein. In some embodiments, the machine 502 operates as a standalone device or may be connected (e.g., networked) to other machines. In a networked environment, the machine 502 may operate in the capacity of a server or a client machine in server-client network environment, or as a peer machine in a peer-to-peer (or distributed) network environment.

The machine 502 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 502 is illustrated, the term "machine" shall also be taken to include any collection of machines that individually or jointly execute a set (or multiple sets) of instructions to perform any one or more of the methodologies discussed herein.

For example, in some embodiments, the instructions 512 may cause the machine to execute a computer-implemented method comprising comparing a first hashed value of at least a first decryption key, the first decryption key received from a sender, to a second hashed value of at least a second decryption key that has been received as a signed value from a receiver. The method may further comprise sending the first decryption key to the receiver and sending the signed value to the sender upon determining that the first hashed value matches the second hashed value to verify that the first decryption key is the same as the second decryption key.

Further activities may include sending the first decryption key to a client device as the receiver, and sending the signed value to a server as the sender, where the server and the client operate as the sender and receiver, respectively. Additional activities may include sending an error message to at least one of the sender or the receiver if the first hashed value does not match the second hashed value as a result of comparing the hashed values.

While the machine-readable medium 508 is shown as a single medium, the term "machine-readable medium" should be taken to include a single medium or multiple media (e.g., a centralized or distributed database, and/or associated caches and servers, and or a variety of storage media, such as the registers of the processor 504, memories 520, 524, and the storage device 506 that store the one or more sets of instructions 512. The term "machine-readable medium" shall also be taken to include any medium that is capable of storing, encoding or carrying a set of instructions for execution by the machine and that cause the machine 502 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may thus provide additional flexibility with respect to communications activity. For example, storage space used by TTP entities may be reduced, since records that serve to prove up the occurrence of transactions between senders and receivers can be discarded after each integral communication transaction is completed. In addition, network bandwidth may be conserved, since the encryption key can be pre-signed by a receiver without knowing the actual key value, so that the encrypted message does not need to be transferred between the entities participating the in transaction more than once.

Various embodiments may be implemented as a standalone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Some embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    comparing, at a trusted third party, a first hashed value of at least a first decryption key, the first decryption key received from a sender, to a second hashed value of at least a second decryption key that has been received as a signed value from a receiver, the receiver having signed a hashed value of an encrypted message to provide the signed hashed value of the encrypted message, and to serve as an indication that the encrypted message has been received by the receiver, and the sender having displayed proof of encrypted message receipt by displaying information confirming receipt of the signed hashed value of an encrypted message; and
    sending the first decryption key to the receiver and sending the signed value from the trusted third party to the sender as an indication that the first description key has been received by the receiver, upon determining that the first hashed value matches the second hashed value to verify that the first decryption key is the same as the second decryption key, the receiver displaying proof of decryption key receipt by displaying information confirming receipt of the signed version.

2. The method of claim 1, further comprising:
    discarding the first hashed value, the second hashed value, the signed value, and the first decryption key as part of an integral communication transaction that includes the comparing and the sending.

3. The method of claim 1, wherein the second hashed value of the at least a second decryption key comprises a hashed value of a decryption key and an identifier.

4. The method of claim 3, wherein the identifier comprises at least one of a sender-provided identifier, a receiver-provided identifier, or a combination of the sender-provided identifier and the receiver-provided identifier.

5. The method of claim 1, further comprising:
    receiving the first decryption key from the sender at a trusted third party via a secure channel.

6. The method of claim 1, further comprising:
    prior to the comparing, decrypting the signed value to provide the second hashed value of at least the second decryption key.

7. The method of claim 6, wherein sending the first decryption key to the receiver comprises:
    sending the first decryption key to the receiver via a secure channel.

8. The method of claim 1, wherein the trusted third party is different from either one of the sender or the receiver.

9. The method of claim 1, wherein the first decryption key sent from the trusted third party to the receiver is transmitted from the sender to the trusted third party prior to performing the comparing.

10. The method of claim 1, wherein the first decryption key is discarded from the trusted third party responsive to the signed value sent from the trusted third party being received by the sender.

11. A method comprising:
sending a signed hashed value of an encrypted message from a receiver to a sender;
receiving, at the receiver, a hashed value of a decryption key;
signing the hashed value of the decryption key to provide a signed version of the hashed value of the decryption key;
sending the signed version to a trusted third party, the signed version to be transmitted from the trusted third party to the sender as an indication that the description key has been received by the receiver
signing a hashed value of the encrypted message to provide the signed hashed value of the encrypted message, and to serve as an indication that the encrypted message has been received by the receiver;
displaying proof of encrypted message receipt by displaying information confirming receipt of the signed hashed value of the encrypted message; and
displaying proof of decryption key receipt by displaying information confirming receipt of the signed version.

12. The method of claim 11, comprising:
receiving, at the receiver, the encrypted message from the sender, prior to the sending of the signed hashed value.

13. The method of claim 11, further comprising:
receiving the decryption key from the trusted third party at the receiver after the sending of the signed version to the trusted third party.

14. The method of claim 11, wherein the decryption key comprises a symmetric key.

15. The method of claim 11, wherein the encrypted message comprises an email message.

16. The method of claim 11, wherein the encrypted message comprises at least one of a funds transfer request, an indication of funds received, or an indication of funds transmitted.

17. The method of claim 11, wherein the encrypted message comprises software program instructions.

18. The method of claim 11, wherein the encrypted message comprises professional advice.

19. An apparatus comprising:
one or more processors;
a memory to store an encrypted message and instructions which, when executed by the one or more processors, results in the one or more processors operating to:
send a signed hashed value of the encrypted message to a sender;
receive a hashed value of a decryption key;
sign the hashed value of the decryption key to provide a signed version of the hashed value of the decryption key; and
send the signed version to a trusted third party, the signed version to be transmitted from the trusted third party to the sender as an indication that the description key has been received by the apparatus;
sign a hashed value of the encrypted message to provide the signed hashed value of the encrypted message, and to serve as an indication that the encrypted message has been received by the receiver; and
a display device to:
display a decrypted form of the encrypted message in human-perceptible format
display proof of encrypted message receipt by displaying information confirming receipt of the signed hashed value of the encrypted message; and
display proof of decryption key receipt by displaying information confirming receipt of the signed version.

20. The apparatus of claim 19, further comprising:
a decryption module to use a decryption key received from the trusted third party to decrypt the encrypted message, providing the decrypted form of the encrypted message.

21. The apparatus of claim 19, further comprising:
an encryption module to provide the signed hashed value of the encrypted message.

22. The apparatus of claim 19, further comprising:
a display device to display a decrypted form of the encrypted message in human-perceptible format.

23. A non-transitory machine-readable storage medium storing instructions that, when executed by a machine, cause the machine to perform operations comprising:
comparing, at a trusted third party, a first hashed value of at least a first decryption key, the first decryption key received from a sender, to a second hashed value of at least a second decryption key that has been received as a signed value from a receiver, the receiver having signed a hashed value of an encrypted message to provide the signed hashed value of the encrypted message, and to serve as an indication that the encrypted message has been received by the receiver, and the sender having displayed proof of encrypted message receipt by displaying information confirming receipt of the signed hashed value of an encrypted message; and
sending the first decryption key to the receiver and sending the signed value from the trusted third party to the sender as an indication that the first description key has been received by the receiver, upon determining that the first hashed value matches the second hashed value to verify that the first decryption key is the same as the second decryption key, the receiver displaying proof of decryption key receipt by displaying information confirming receipt of the signed version.

24. The medium of claim 23, wherein the sending further comprises:
sending the first decryption key to a client device as the receiver; and
sending the signed value to a server as the sender.

25. The medium of claim 23, wherein the method further comprises:
sending an error message to at least one of the sender or the receiver if the first hashed value does not match the second hashed value as a result of the comparing.

* * * * *

UNITED STATES PATENT AND TRADEMARK OFFICE
CERTIFICATE OF CORRECTION

PATENT NO.         : 8,458,477 B2                                    Page 1 of 1
APPLICATION NO.    : 12/325425
DATED              : June 4, 2013
INVENTOR(S)        : Sudhakar et al.

It is certified that error appears in the above-identified patent and that said Letters Patent is hereby corrected as shown below:

In the Claims:

In column 11, line 11, in claim 11, after "receiver", insert --;--, therefor

In column 12, line 5, in claim 19, after "format", insert --;--, therefor

Signed and Sealed this
Twenty-second Day of April, 2014

Michelle K. Lee
*Deputy Director of the United States Patent and Trademark Office*